United States Patent
Gune et al.

(10) Patent No.: US 9,811,807 B2
(45) Date of Patent: Nov. 7, 2017

(54) SHARING RECRUITING DATA ACROSS BUSINESS UNITS OF AN ORGANIZATION

(71) Applicant: LinkedIn Corporation, Mountain View, CA (US)

(72) Inventors: Prasad Kamalakar Gune, Fremont, CA (US); Annabel Fang Liu, Los Altos, CA (US); Pierre Yannick Monestie, Half Moon Bay, CA (US); Lei Ni, Belmont, CA (US)

(73) Assignee: LinkedIn Corporation, Sunnyvale, CA (US)

(*) Notice: Subject to any disclaimer, the term of this patent is extended or adjusted under 35 U.S.C. 154(b) by 533 days.

(21) Appl. No.: 14/550,736

(22) Filed: Nov. 21, 2014

(65) Prior Publication Data

US 2015/0278766 A1 Oct. 1, 2015

Related U.S. Application Data

(60) Provisional application No. 61/972,957, filed on Mar. 31, 2014.

(51) Int. Cl.
| | |
|---|---|
| *H04L 29/06* | (2006.01) |
| *G06Q 10/10* | (2012.01) |
| *G06Q 50/00* | (2012.01) |
| *G06F 7/04* | (2006.01) |
| *G06F 15/16* | (2006.01) |
| *G06F 17/30* | (2006.01) |

(52) U.S. Cl.
CPC ......... *G06Q 10/1053* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,071,650 B1* | 6/2015 | Cooper | H04L 67/2819 |
| 2011/0145355 A1* | 6/2011 | Mattern | G06Q 10/10 |
| | | | 709/206 |
| 2012/0303652 A1* | 11/2012 | Tseng | G06Q 30/02 |
| | | | 707/769 |
| 2013/0091008 A1* | 4/2013 | Liubachev | G06Q 30/02 |
| | | | 705/14.41 |
| 2013/0275455 A1* | 10/2013 | Dutta | G06F 17/30864 |
| | | | 707/769 |

(Continued)

*Primary Examiner* — Eric Chen
(74) *Attorney, Agent, or Firm* — Schwegman Lundberg & Woessner, P.A.

(57) ABSTRACT

A method of sharing recruiting data between business units of an organization is disclosed. It is determined that a first business unit has a contract to use a first set of resources of a social-networking system to manage a first set of profiles. It is determined that a second business unit has a contract to use a second set of resources to manage a second set of profiles. It is determined that the first entity used the first set of resources to create a private data item and to associate the private data item with a profile of the first set of profiles. It is determined that the profile of the first set of profiles and a profile of the second set of profiles correspond to the same person. The second entity is provided with access to the private data item, but not control of the first set of resources.

17 Claims, 7 Drawing Sheets

(56) References Cited

U.S. PATENT DOCUMENTS

2014/0330732 A1* 11/2014 Grignon ................ G06Q 50/01
  705/319
2016/0078489 A1* 3/2016 Hu ..................... G06Q 30/0269
  705/14.66

* cited by examiner

SHARING RECRUITING DATA ACROSS BUSINESS UNITS OF AN ORGANIZATION

CROSS-REFERENCE TO RELATED APPLICATIONS

This application claims the benefit of U.S. Provisional Application No. 61/972,957, filed Mar. 31, 2014, entitled "SHARING JOB RECRUITING DATA ACROSS BUSINESS UNITS OF AN ORGANIZATION," which is incorporated herein by reference in its entirety.

TECHNICAL FIELD

This application relates generally to the technical field of online social networking, and, in one specific example, to allowing job recruiters of a business unit of an organization to share information about potential job candidates with job recruiters of other business units of the organization.

BACKGROUND

Various business organizations may be organized into separate strategic business units. Each of these business units may be responsible for its own profitability. Thus, each of these business units may engage in separate contracts for services with third parties, such as third parties providing job recruiting services, storage services, advertising services, and so on. For example, each business unit within an organization may have a separate contract with a third-party social networking system (e.g., LinkedIn) to provide job recruiting services.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail.

In various embodiments, a method of sharing recruiting data between business units of an organization is disclosed. It is determined that a first business unit has a contract to use a first set of resources of a social-networking system to manage a first set of member profiles. It is determined that a second business unit has a contract to use a second set of resources of the social-networking system to manage a second set of member profiles. It is determined that the first entity used the first set of resources to create a private data item and to associate the private data item with a member profile of the first set of member profiles. It is determined that the member profile of the first set of member profiles and a member profile of the second set of member profiles correspond to the same person. The second entity is provided with access to the private data item, but not control of the first set of resources.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
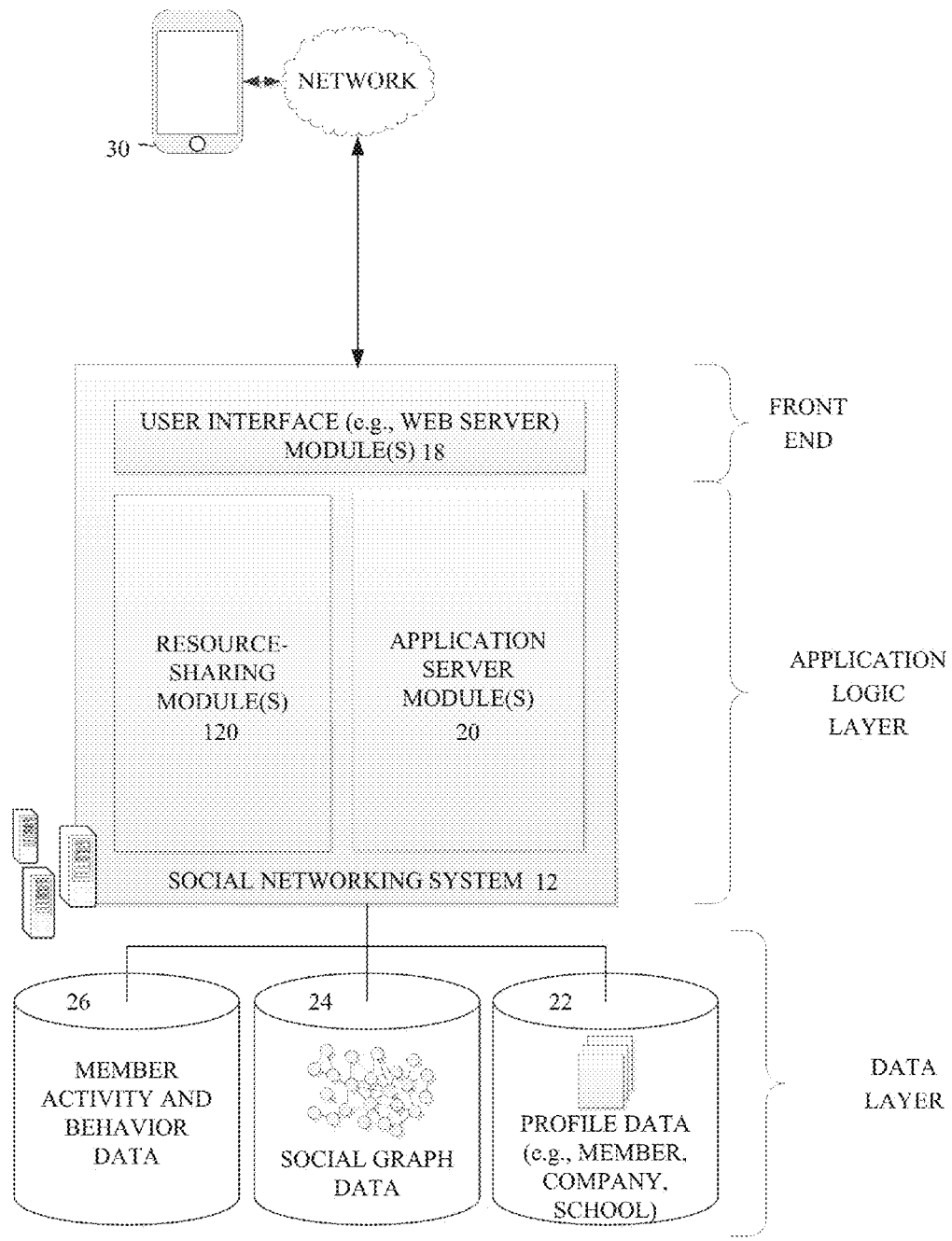
FIG. 1 is a network diagram depicting an example client-server system within which various embodiments may be deployed.

FIG. 1 is a network diagram depicting a server system (e.g., social networking system 12) that includes resource-sharing module(s) 120 for responding to requests or commands received from a mobile computing device 30, consistent with some embodiments of the present invention. As described in greater detail below, the resource-sharing module(s) 120 may be configured to receive commands or requests from mobile computing devices, such as that with reference number 30 in FIG. 1, process or analyze the commands or requests, and transmit responses to the commands or requests. In various embodiments, the received commands or requests may include various information, such as a member identifier uniquely identifying a member of the social networking service (e.g., corresponding to a user of the mobile computing device 30), location information identifying a member's current location, and so on.

As shown in FIG. 1, the social networking system 12 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module (e.g., a web server) 18, which receives requests from various client-computing devices including one or more mobile computing devices 30, and communicates appropriate responses to the requesting client computing devices. For example, the user interface module(s) 18 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile computing devices and mobile-specific operating systems.

As shown in FIG. 1, the data layer includes several databases, including a database 22 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be promoted to provide some personal information, such as his or her name, age birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 22.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 12, information relating to the member's activity and behavior may be stored in a database, such as the database with reference number 26.

The social networking system 12 may provide abroad range of other applications and services that allow members the opportunity to share and receive information, often customized to the interests of the member. For example, with some embodiments, the social networking system 12 may include a photo sharing application that allows members to upload and share photos with other members. With some embodiments, members of a social networking system 12 may be able to self-organize into groups, or interest groups, organized around a subject matter or topic of interest. With some embodiments, members may subscribe to or join groups affiliated with one or more companies. For instance, with some embodiments, members of the social networking service 12 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with the social graph data of the database with reference number 24.

The application logic layer includes various application server modules 20, which, in conjunction with the user interface module(s) 12, generates various user interfaces with data retrieved from various data sources or data services in the data layer. With some embodiments, individual application server modules 20 are used to implement the functionality associated with various applications, services and features of the social networking system. For instance, a messaging application, such as an email application, an instant messaging application, or some hybrid or variation of the two, may be implemented with one or more application server modules 20. A photo sharing application may be implemented with one or more application server modules 20. Similarly, a search engine enabling users to search for and browse member profiles may be implemented with one or more application server modules 20. Of course, other applications and services may be separately embodied in their own application server modules 20.

As illustrated in FIG. 1, social networking system 12 includes resource-sharing module(s) 120, which are described in more detail below.

Figure 2A:
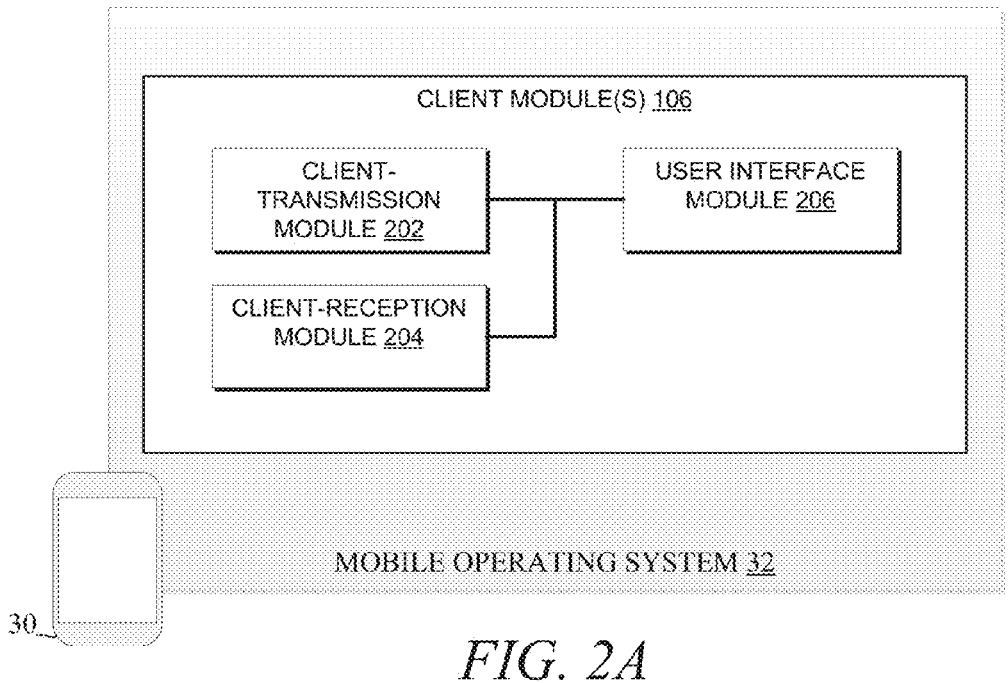
FIG. 2A is a block diagram depicting example client module(s) that may implement various embodiments.

FIG. 2A is a block diagram depicting example client module(s) 106 of a mobile computing device 30, consistent with some embodiments of the invention. As is understood by skilled artisans in the relevant computer- and mobile device-related arts, each module or engine shown in FIG. 2A represents a set of executable software instructions and the corresponding hardware (e.g., memory, processor, sensor devices) for executing the instructions, and deriving or generating relevant data. To avoid obscuring the inventive subject matter with unnecessary detail, various functional modules and engines that are not germane to conveying an understanding of the inventive subject matter have been omitted from FIG. 2A.

As illustrated in FIG. 2A, the mobile computing device 30 includes a mobile operating system 32. The client module(s) 106 include various modules 202-206. A client-transmission module 202 may send communications (e.g., to the resource-sharing module(s) 120). A client-reception module 204 may receive communications (e.g., from the resource-sharing module(s) 120). A user interface module 206 may present a user interface to a user of the mobile computer device 30, such as any of the user interfaces described herein.

Figure 2B:
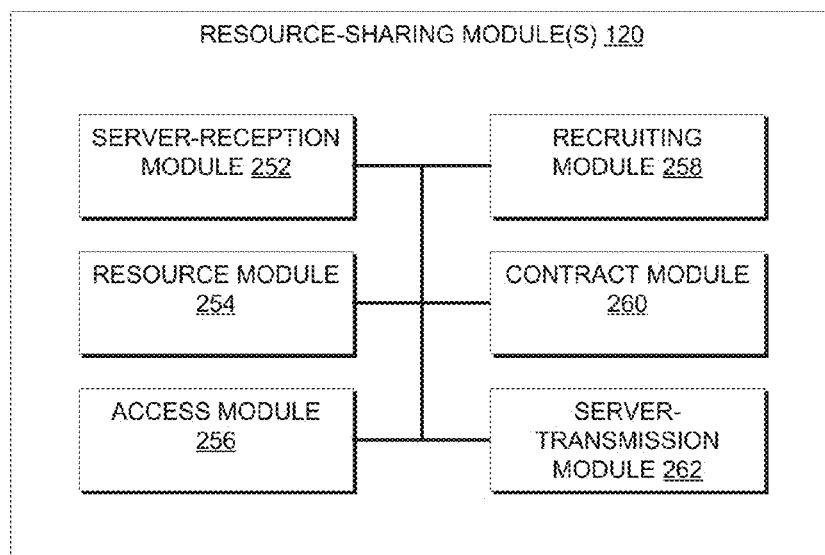
FIG. 2B is a block diagram illustrating example server module(s) that may implement various embodiments.

FIG. 2B is a block diagram illustrating example resource-sharing module(s) 120. A server-reception module 252 may be configured to receive communications e.g., from the mobile computing device 30), such as requests to manage annotations associated with a profile of a user of the social-networking system, as will be described in more detail below.

A resource module 254 may be configured to provide resources to a business unit of an organization based on a contract between the business unit and the social-networking system.

An access module 256 may be configured to control access to data generated by each business unit of the organization.

A recruiting module 258 may be configured to provide a business unit with recruiting services, as will be described in more detail below.

A contract module 260 may be configured to manage contracts associated with various business units of the organization.

A server-transmission module 264 may be configured to transmit communications (e.g., to the client module(s) 106), such as communications instructing the client module(s) to display a user interface on the mobile computing device 30.

Although the functionality corresponding to modules 202-206 is depicted and described as being implemented on the client side (e.g., by the client module(s) 106), in various embodiments, some or all of the functionality corresponding to modules 202-206 may be implemented on the server side (e.g., by the resource-sharing module(s) 120), and vice versa. Thus, in various embodiments, one or more algorithms implemented on the client side or server side may utilize information collected about the user on the client or server side, such as the member's current activity, current location, past behavior, social/graph data, profile data, and so on.

Figure 3:
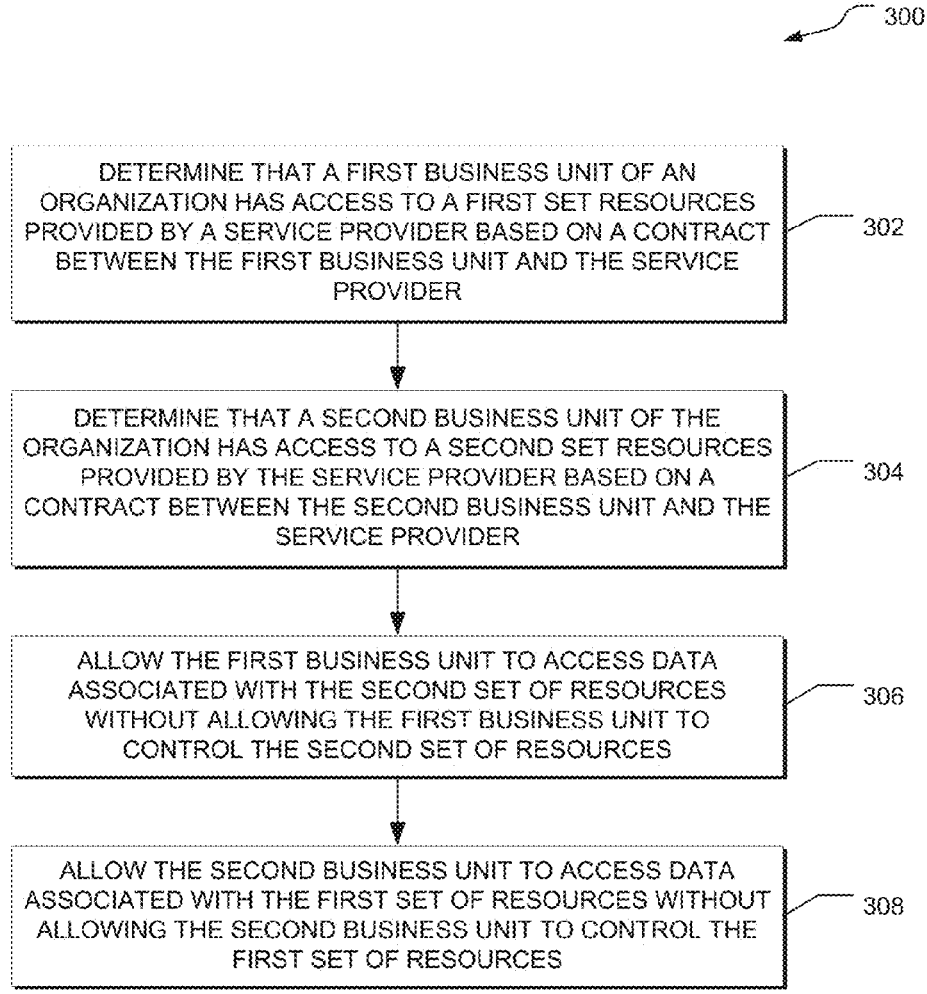
FIG. 3 is a flow chart illustrating example operations of a method of sharing data items pertaining to contracted-for resources without sharing control of those resources.

FIG. 3 is a flow chart illustrating example operations of a method 300 of sharing data items pertaining to contracted-for resources without sharing control of those resources. In various embodiments, the method 300 may be implemented by one or more of the modules of FIGS. 2A-2B.

At operation 302, the resource module 254 may determine that a first business unit of an organization has access to a first set of resources provided by a service provider based on a contract between the first business unit and the service provider. For example, if the service provider is a social-networking system that provides recruiting services (e.g., LinkedIn), the first set of resources to which the first business unit may have access may include resources pertaining to allowing an entity associated with the business unit to manage (e.g., create, modify, and remove) profiles (e.g., of potential job candidates), manage projects (e.g., create, modify, or remove repositories for managing data associated with recruiting projects; for example, a folder containing profiles of potential candidates for a job opening), manage metadata, such as annotations, including notes or reminders, or other data (e.g., activity data, such as a number of views) associated with each profile, manage searches (e.g., save results of searches performed or save a set of keywords associated with searches performed), manage communications (e.g., view messages sent or view messages received via a messaging system of the service provider), manage mail templates (e.g., create, modify, or remove templates for mass mailings), manage postings of job opportunities (e.g., create, modify, or remove postings pertaining to job opportunities in the business unit), and so on.

In various embodiments, a contract between a business unit and the organization may associate a particular number of seats to the business unit and allocate the first set of resources to each of the seats. The business unit may then assign an entity (e.g., an administrator or other user) to each of the seats, allowing the entity to make use of the resources on behalf of the business unit. Thus, in the context of recruiting services, the business unit may associate a first job recruiter with a first seat of the contract, giving the job recruiter access to resources provided by the service provider for managing profiles, projects, metadata, searches, communications, job postings, and so on. For example, the business unit may assign or reassign job recruiters to each of the seats provided for in the contract.

At operation 304, the resource module 254 may determine that a second business unit of the organization has access to a second set of resources provided by the service provider based on a contract between the second business unit and the service provider. For example, in the context of recruiting services, the resource module may determine that a contract between the second business unit and the service provider provides the second business unit with a particular number of seats, each of the sets being associated with a second set of resources, such as resources for managing profiles, projects, metadata, searches, communications, job postings, and so on.

At operation 306, the access module 256 may allow the first business unit to access data associated with the second set of resources without allowing the first business to administer or otherwise control the second set of resources. For example, a job recruiter of the first business unit who is assigned a seat associated with the first set of resources (e.g., based on a contract between the first business unit and the service provider) may be provided with the ability to access one or more data items associated with the second set of resources. Here, the second set of resources may be provided to a job recruiter of the second business unit who is assigned a seat associated with the second set of resources (e.g., based on a contract between the second business unit and the service provider). However, the job recruiter associated with the first business unit may not be able to manage the data items maintained by the job recruiter associated with the second business unit. For example, the job recruiter associated with the first business unit may not be able to create, modify, or remove profiles, projects, metadata, searches, communications, job postings, and so on that are associated with the second set of resources.

In various embodiments, the accessing of the data associated with the second set of resources by the entity associated with the first business unit may be provided seamless to the user in a user interface (e.g., presented by the user interface module 206). For example, upon accessing a profile of a potential job candidate that is associated with a recruiting project of the first business unit, the entity may be notified of data items (e.g., notes, reminders, communications, and so on) that are maintained by an entity associated with a different recruiting project associated with the different business unit of the organization (e.g., based on a determination that the second business unit also maintains a profile of the job candidate). Thus, to the entity associated with the first business unit, it may appear that profiles of potential job candidates are maintained as master profiles having associated metadata that is maintained separately by each business unit.

At operation 308, the access module 256 may allow the second business unit to access data associated with the first set of resources without allowing the second business unit to control the first set of resources. For example, a job recruiters of the second business unit who is assigned a seat associated with the second set of resources (e.g., based on a contract between the second business unit and the service provider) may be provided with the ability to access one or more data items associated with first set of resources. However, the job recruiter associated with the second business unit may not be able to manage the data items maintained by the job recruiters associated with the first business unit. For example, the job recruiter associated with the second business unit may not be able to create, modify, or remove profiles, projects, metadata, searches, communications, job postings, and so on, that are associated with the first set of resources.

In this way, business units of an organization may benefit from accessing data pertaining to activities of other business units of the organization without being given the authority or power to change that data. And business units that have entered into a contract with a service provider need not provide other business units of the organization with the ability to control services that they are not paying for.

Figure 4:
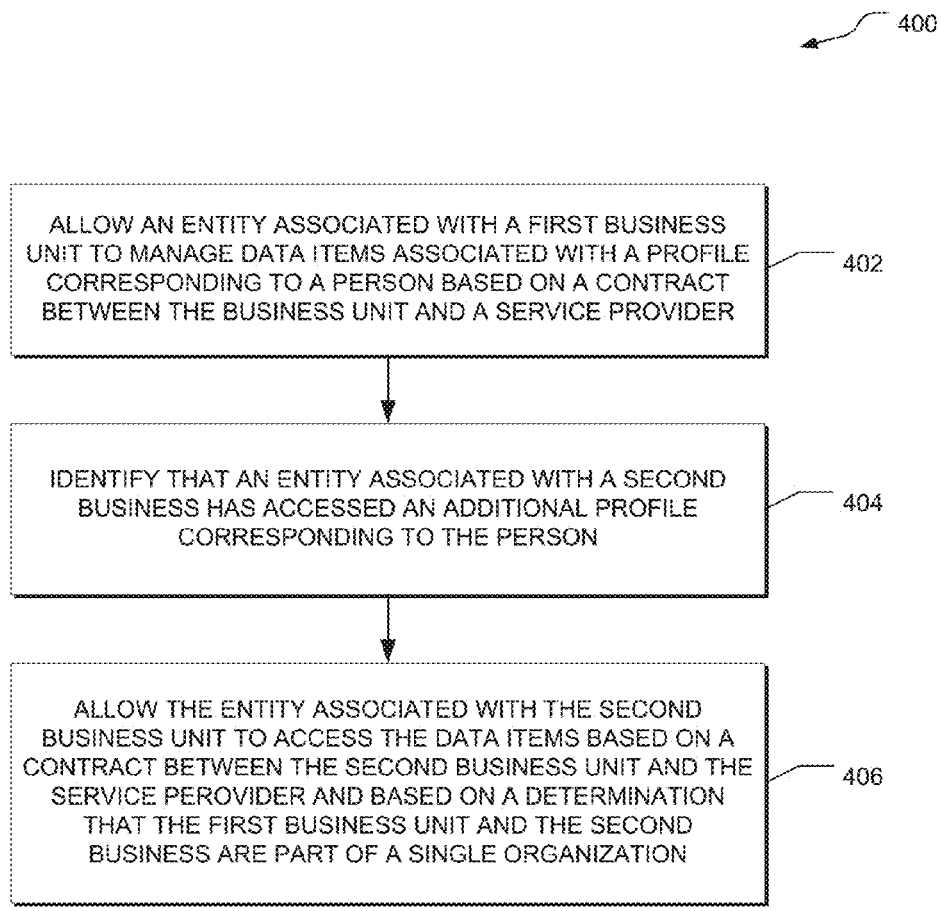
FIG. 4 is a flow chart illustrating example operations of a method of allowing an entity associated with a first business to access annotations managed by an entity associated with a second business unit with respect to a profile.

FIG. 4 is a flow chart illustrating example operations of a method 400 of allowing an entity associated with a first business to access annotations managed by an entity associated with a second business unit with respect to a profile. In various embodiments, the method 400 may be implemented by one or more of the modules of FIGS. 2A-2B.

At operation 402, the recruiting module 258 may allow an entity associated with a first business unit manage data items associated with a profile (e.g., of a person, such as potential job candidate) based on a contract between the business unit and a service provider. For example, the recruiting module 258 may allow the entity associated with the first business unit to create metadata (e.g., an annotation, a tag, a reminder, and so on) and associate the metadata with the profile. Or the recruiting module 258 may allow the entity associated with the first business unit to send a communication to or receive a communication from the person associated with the profile. Or the recruiting module 258 may allow the entity associated with the first business unit to associate an attachment (e.g., a resume) with the profile.

At operation 404, the recruiting module 258 may identify that an entity associated with a second business unit has accessed an additional profile corresponding to the person. For example, the recruiting module 258 may determine that the entity associated with the second business unit has created an additional profile corresponding to the person that is maintained with respect to a project of the second business unit. The determination that the profiles maintained separately by each of the business units may be based on a matching of data associated with the respective profiles, e.g., names, email addresses, and so on).

At operation 406, the access module 256 may allow the entity associated with the second business unit to access the data items maintained by the first business unit with respect to the profile. The access may be granted based on a determination that the first business unit and the second business unit are part of a single business organization (e.g., a single corporation). The access may further be granted based, a contract between the second business unit and the service provider or a contract between the first business unit and the service provider, or both. For example, the access may be granted based on a determination the contract between the first business unit and the service provider provides that additional business units of an organization of the first business unit is to be granted access to the resources maintained by an entity associated with the first business unit.

Figure 5:
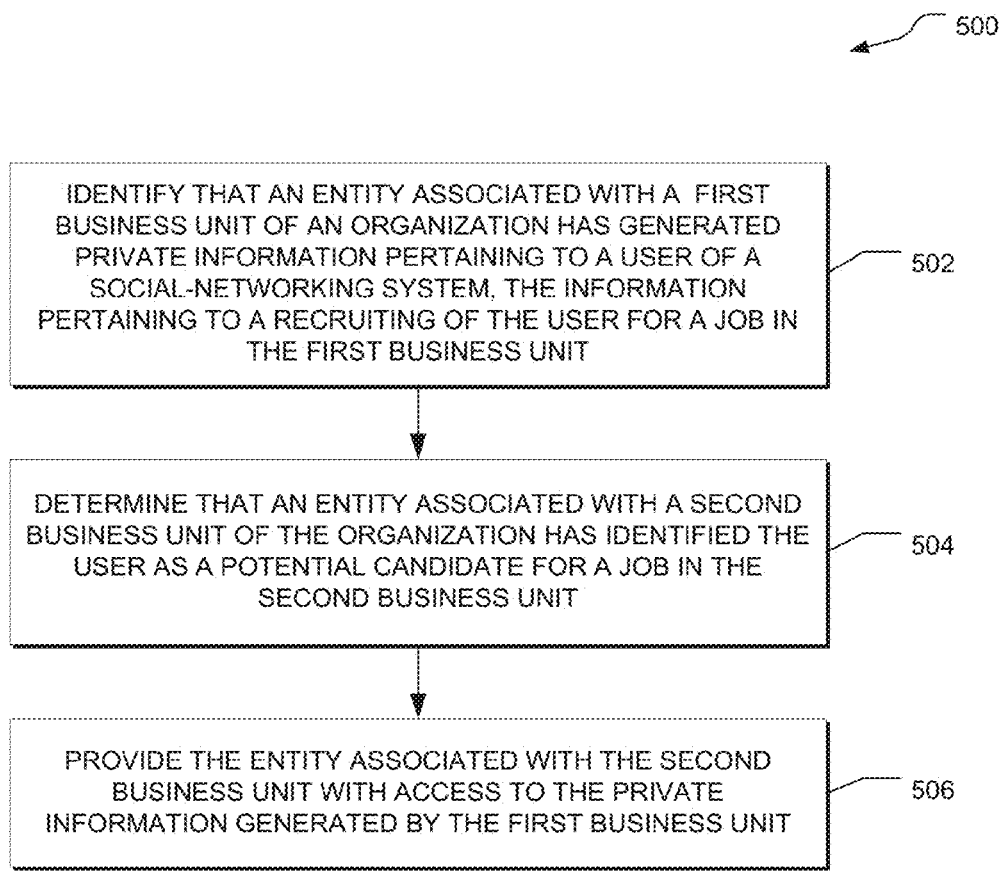
FIG. 5 is a flow chart illustrating example operations of a method of providing an entity associated with a second business unit of an organization with access to information generated by the first business of the organization.

FIG. 5 is a flow chart illustrating example operations of a method 500 of providing an entity associated with a second business unit of an organization with access to information generated by the first business of the organization. In various embodiments, the method 500 may be implemented by one or more of the modules of FIGS. 2A-2B.

At operation 502, the recruiting module 258 identifies that an entity associated with a first business unit has generated private information pertaining to a user of a social-networking system, the information pertaining to a recruiting of the user for a job in the first business unit. In various embodiments, the information is private information in that access to the information is initially limited to entities associated with the first business unit. For example, the recruiting module 258 identifies that an entity associated with the business unit has annotated a profile of the user with information that the user has not included in a version of the profile that is public to other users of the social-networking system. For example, in the public version of the profile maintained by the user, the user may provide general information, such as the name of the user and names of companies that have employed the user. The entity associated with the business unit may supplement the data provided by the user in his public profile with more specific, private information, such as an email address of the user, a home address of the user, dates of employment of the user, and so on. These supplemental annotations may be initially accessible only to entities associated with the first business unit (e.g., job recruiters assigned to seats provided to the first business unit based on a contract between the first business unit and the social-networking system).

At operation 504, the recruiting module 258 determines that an entity associated with a second business unit of the organization has identified the user as a potential candidate for a job in the second business unit. For example, the recruiting module 258 may determine that an entity associated with the second business unit has associated the public profile of the user with a recruiting project managed by the second business unit.

At operation 506, the recruiting module 258 provides the entity associated with the second business unit with access to the private information generated by the first business unit. For example, upon associating the public profile of the user with a recruiting project, the entity associated with the second business unit may be notified of the information generated by the first business unit. Or, upon viewing the public profile of the user in a user interface, the entity associated with the second business unit may be provided with the information generated by the first business unit. Thus, the entity of the second business unit may receive the benefit of information generated by other business units of the organization with respect to the potential job candidate. However, the entity of the second business unit may not be granted control of the information—in other words, the entity of the second business unit may not be able to modify or remove the information maintained by the first business unit with respect to the candidate.

Figure 6:
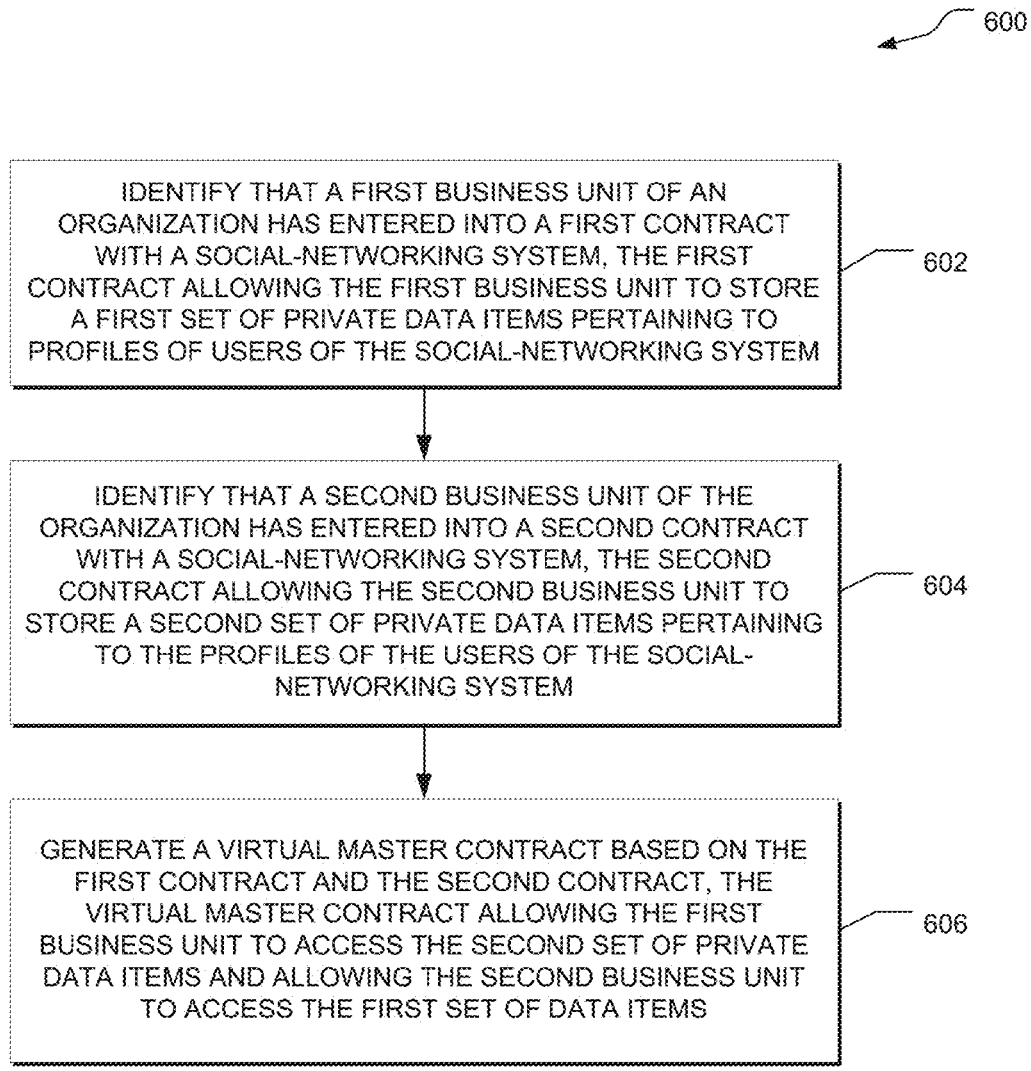
FIG. 6 is a flow chart illustrating example operations of a method of generating a virtual master contract to facilitate the sharing of business-unit-specific information across multiple business units of an organization.

FIG. 6 is a flow chart illustrating example operations of a method 600 of generating a virtual master contract to facilitate the sharing of business-unit-specific information across multiple business units of an organization. In various embodiments, the method 600 may be implemented by one or more of the modules of FIGS. 2A-2B.

At operation 602, the contract module 260 identifies that a first business unit of an organization has entered into a first contract with a social-networking system. Here, for example, the first contract may allow the first business unit to store a first set of private data items pertaining to profiles of users of the social-networking system.

At operation 604, the contract module 260 identifies that a second business unit of the organization has entered into a second contract with the social-networking system. Here, for example, the second contract may allow the second business unit to store a second set of private data items pertaining to the profiles of the users of the social-networking system.

At operation 606, the contract module 260 generates a virtual master contract based on the first contract and the second contract. Here, the virtual master contract aggregates the first contract and the second contract to facilitate the sharing of contracted-for resources across multiple business units of the organization. For example, the virtual master contract allows the first business unit to access the second set of private data items based on provisions set forth in the contract between the first business unit and the social-networking system and further allows the second business unit to access the first set of data items based on provisions set forth in the contract between the second business unit and the social-networking system. In this way, by viewing properties of the virtual master contract, an entity associated with the organization may obtain a high-level view of contracts entered into a social-networking system by various business units of the organization. For example, such properties may include the total number of seats allocated to the organization and the total number of resources assigned to each of those seats. Additionally, the virtual master contract may specify which business units share which data items with which other business units. Thus, an administrator associated with the organization may be given high-level visibility into how contracted-for resources are shared by business units across the organization.

Figure 7:
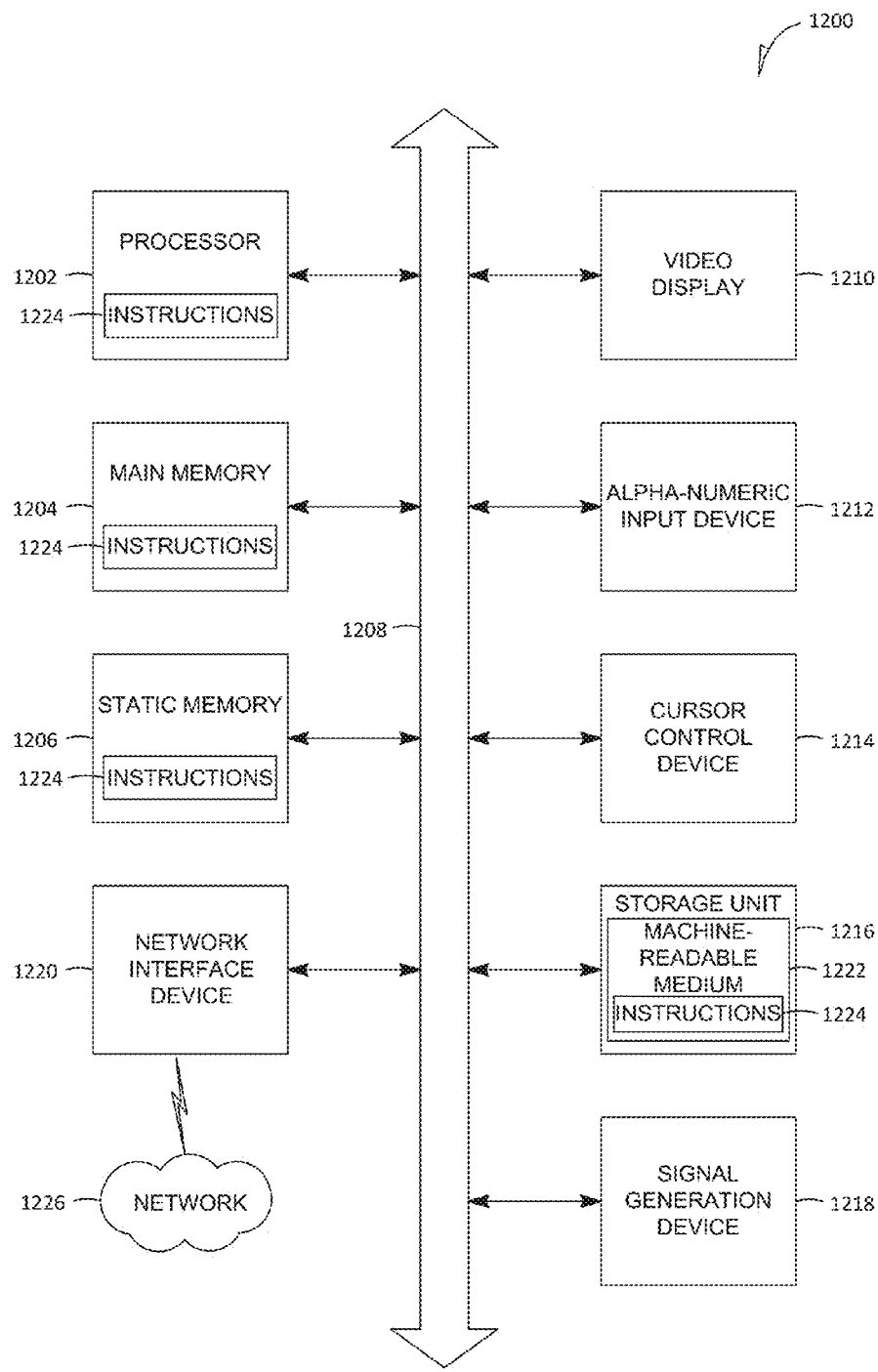
FIG. 7 is a block diagram of a machine in the example form of a computer system within which instructions for causing the machine to perform any one or more of the methodologies discussed herein may be executed.

FIG. 7 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UT) navigation (or cursor control) device 1214 (e.g., a mouse), a storage unit 1216, a signal generation device 1218 (e.g., a speaker) and a network interface device 1270.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., Wifi and WiMax networks). The term "transmission medium" shalt be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a first business unit has a first contract with a social-networking system, the first contract allowing a first entity to use a first set of resources of the social-networking system to manage a first set of profiles, the first entity being associated with the first business unit;
   determining that a second business unit has a second contract with the social-networking system, the second contract allowing the second entity to use a second set of resources of the social-networking system to manage a second set of profiles, the second entity being associated with the second business unit;
   determining that the first entity used the first set of resources to create a private data item and to associate the private data item with a profile of the first set of profiles;
   determining that the profile of the first set of profiles and a profile of the second set of profiles correspond to the same person based on a matching of the private data item with an additional private data item, the second entity having used the second set of resources to create the additional private data item and associate the additional private data item with the profile of the second set of profiles; and
   providing the second entity with access to the private data item without providing the second entity with control of the first set of resources.

2. The method of claim 1, wherein the providing of the second entity with access to the private data item is based on a determination that the first business unit and the second business unit are part of a single organization.

3. The method of claim 1, wherein the providing of the second entity with access to the private data item is based on the second entity using the second set of resources to access the profile of the second set of profiles.

4. The method of claim 1, wherein the providing of the second entity with access to the private data item includes presenting the (private data item in a user interface, the presenting including a representation of an association of the private data item with the profile of the second set of profiles.

5. The method of claim 4, wherein the association of the private data item with the profile of the second set of profiles is based on the association between the private data item with the profile of the first set of profiles.

6. The method of claim 1, wherein the profile of the first set of profiles and the profile of the second set of profiles correspond to a public profile maintained with respect to the social-networking system by the person.

7. A system comprising:
   one or more hardware processors configured to implement one or more modules, the one or more modules configured to:
   determining that a first business unit has a first contract with a social-networking system, the first contract allowing a first entity to use a first set of resources of the social-networking system to manage a first set of profiles, the first entity being associated with the first business unit;
   determining that a second business unit has a second contract with the social-networking system, the second contract allowing the second entity to use a second set of resources of the social-networking system to manage a second set of profiles, the second entity being associated with the second business unit;
   determining that the first entity used the first set of resources to create a private data item and to associate the private data item with a profile of the first set of profiles;
   determining that the profile of the first set of profiles and a profile of the second set of profiles correspond to the same person based on a matching of the private data item with an additional item, the second entity having used the second set of resources to create the additional private data item and associate the additional private data item with the profile of the second set of profiles; and
   provide the second entity with access to the private data item without providing the second entity with access to the first set of resources.

8. The system of claim 7, wherein the providing of the second entity with access to the private data item is based on a determination that the first business unit and the second business unit are part of a single organization.

9. The system of claim 7, wherein the providing of the second entity with access to the private data item is based on the second entity using the second set of resources to access the profile of the second set of profiles.

10. The system of claim 7, wherein the providing of the second entity with access to the private data item includes presenting the private data item in a user interface, the presenting including a representation of an association of the private data item with the profile of the second set of profiles.

11. The system of claim 10, wherein the association of the private data item with the profile of the second set of profiles is based on the association between the private data item with the profile of the first set of profiles.

12. The system of claim 7, wherein the profile of the first set of profiles and the profile of the second set of profiles correspond to a public profile maintained with respect to the social-networking system by the person.

13. A non-transitory computer readable medium, the computer readable medium embodying a set of instruction that, when executed by a processor, cause the processor to perform operations, the operations comprising:
- determining that a first business unit has a first contract with a social-networking system, the first contract allowing a first entity to use a first set of resources of the social-networking system to manage a first set of profiles, the first entity being associated with the first business unit;
- determining that a second business unit has a second contract with the social-networking system, the second contract allowing the second entity to use a second set of resources of the social-networking system to manage a second set of profiles, the second entity being associated with the second business unit;
- determining that the first entity used the first set of resources to create a private data item and to associate the private data item with a profile of the first set of profiles;
- determining that the profile of the first set of profiles and a profile of the second set of profiles correspond to the same person based on a matching of the private data item with an additional private data item, the second entity having used the second set of resources to create the additional private data item and associate the additional private data item with the profile of the second set of profiles; and
- providing the second entity with access to the private data item without providing the second entity with control of the first set of resources.

14. The computer readable medium of claim 13, wherein the providing of the second entity with access to the private data item is based on a determination that the first business unit and the second business unit are part of a single organization.

15. The computer readable medium of claim 13, wherein the providing of the second entity with access to the private data item is based on the second entity using the second set of resources to access the profile of the second set of profiles.

16. The computer readable medium of claim 13, wherein the providing of the second entity with access to the private data item includes presenting the private data item in a user interface, the presenting including a representation of an association of the private data item with the profile of the second set of profiles.

17. The computer readable medium of claim 16, wherein the association of the private data item with the profile of the second set of profiles is based on the association between the private data item with the profile of the first set of profiles.

* * * * *

UNITED STATES PATENT AND TRADEMARK OFFICE
CERTIFICATE OF CORRECTION

PATENT NO.         : 9,811,807 B2
APPLICATION NO.    : 14/550736
DATED              : November 7, 2017
INVENTOR(S)        : Gune et al.

Page 1 of 1

It is certified that error appears in the above-identified patent and that said Letters Patent is hereby corrected as shown below:

In the Claims

In Column 12, Line 5, in Claim 4, delete "(private" and insert --private-- therefor Signed and Sealed this
Tenth Day of March, 2020

Andrei Iancu
*Director of the United States Patent and Trademark Office*